United States Patent
Rod et al.

(10) Patent No.: US 11,201,471 B2
(45) Date of Patent: Dec. 14, 2021

(54) METHOD OF OPERATING AN ENERGY SYSTEM

(71) Applicant: CSEM CENTRE SUISSE D'ELECTRONIQUE ET DE MICROTECHNIQUE SA—RECHERCHE ET DEVELOPPEMENT, Neuchâtel (CH)

(72) Inventors: Christian Rod, Morges (CH); Pierre-Jean Alet, Neuchâtel (CH); Vincenzo Musolino, Neuchâtel (CH); Nelson Koch, Bienne (CH)

(73) Assignee: CSEM CENTRE SUISSE D'ELECTRONIQUE ET DE MICROTECHNIQUE SA—RECHERCHE ET DÉVELOPPEMENT, Neuchâtel (CH)

( * ) Notice: Subject to any disclaimer, the term of this patent is extended or adjusted under 35 U.S.C. 154(b) by 0 days.

(21) Appl. No.: 16/769,657

(22) PCT Filed: Nov. 29, 2018

(86) PCT No.: PCT/EP2018/083037
§ 371 (c)(1),
(2) Date: Jun. 4, 2020

(87) PCT Pub. No.: WO2019/110421
PCT Pub. Date: Jun. 13, 2019

(65) Prior Publication Data
US 2021/0184466 A1    Jun. 17, 2021

(30) Foreign Application Priority Data
Dec. 7, 2017 (EP) .................... 17205857

(51) Int. Cl.
*H02J 1/10* (2006.01)
*H02J 3/46* (2006.01)
(Continued)

(52) U.S. Cl.
CPC ................. *H02J 3/32* (2013.01); *H02J 3/003* (2020.01); *H02J 3/004* (2020.01); *H02J 3/381* (2013.01);
(Continued)

(58) Field of Classification Search
CPC .... H02J 3/32; H02J 3/381; H02J 3/003; H02J 3/004; H02J 2310/10; H02J 2300/20
(Continued)

(56) References Cited

U.S. PATENT DOCUMENTS

2012/0215368 A1    8/2012  Ratnesh
2016/0118800 A1    4/2016  Claus et al.
(Continued)

FOREIGN PATENT DOCUMENTS

EP    3010107    4/2016

OTHER PUBLICATIONS

Musolino Vincenzo et al, "Improved ramp-rate and self consumption ratio in a renewable-energy-based DC micro-grid", 2017 IEEE Second International Conference on DC Microgrids (ICDCM), IEEE, Jun. 27, 2017 (Jun. 27, 2017), p. 564-570, XP033136443.

*Primary Examiner* — Richard Tan
(74) *Attorney, Agent, or Firm* — Duane Morris LLP; Gregory M. Lefkowitz

(57) ABSTRACT

Method of operating an energy system, said energy system comprising:
  a local common transmission bus;
  at least one local energy connected to said bus;
  at least one local load connected to said bus;
  an energy store connected to said bus;
(Continued)

a controllable interface arranged to exchange energy between said bus and an external distribution network external to said energy system;

a controller adapted to control said interface so as to carry out said exchange of energy.

According to the invention, the controller defines three modes based on the state of charge of the energy store which determine if, and how, energy is exchanged with the external network so as to optimize self-consumption and to perform ramp-rate reduction and peak shaving as appropriate.

13 Claims, 4 Drawing Sheets

(51) Int. Cl.
    *H02J 3/32*        (2006.01)
    *H02J 3/00*        (2006.01)
    *H02J 3/38*        (2006.01)

(52) U.S. Cl.
    CPC ....... *H02J 2300/20* (2020.01); *H02J 2310/10* (2020.01)

(58) Field of Classification Search
    USPC .......................................................... 307/24
    See application file for complete search history.

(56) References Cited

U.S. PATENT DOCUMENTS

2017/0102433 A1    4/2017   Drees et al.
2019/0020196 A1*   1/2019   Poon ....................... H04L 67/10

\* cited by examiner

METHOD OF OPERATING AN ENERGY SYSTEM

CROSS-REFERENCE TO RELATED APPLICATIONS

This application is a § 371 national stage entry of International Application No. PCT/EP2018/083037, filed Nov. 29, 2018, which claims priority of European Application No. 17205857.0, filed Dec. 7, 2017, the entire contents of which are incorporated herein by reference.

TECHNICAL FIELD

The present invention relates to the technical field of energy systems. More particularly, it relates to a method of operating an energy system, in which the energy can be electrical, thermal, pneumatic, hydraulic or similar.

STATE OF THE ART

Currently there is a lot of interest in local microgrid energy systems integrating a local energy source such as a photovoltaic (PV) system, combined heat and power generator, wind turbines or similar, in order to produce power in a delocalized fashion and to reduce energy demand on large-scale grids. In some jurisdictions, electrical power can also be fed into the grid from such small-scale production, and sold to local energy supplier at a feed-in tariff. However, such local production rarely matches the entire profile of the local energy consumption, and is often highly variable. As a result, such systems often incorporate local energy storage such as a supercapacitor bank, battery system or similar to act as a buffer, and to avoid excessive peaks in respect of power being taken from or fed into the wider grid.

In the paper "Improved ramp-rate and self consumption ratio in a renewable-energy-based DC micro-grid", IEEE 2017, INSPEC accession number 17083549, the present inventors described a DC microgrid energy system with an architecture based around a single-bus architecture, to which all components of the system involving energy transmission are electrically attached. To this end, the system comprises a local energy producer such as a PV system, local loads, a local energy store (namely a supercapacitor bank) and an interface with the external grid. This document describes improving the ramp-rate and self-consumption ratio of such a system by controlling the interface to injecting excess locally-generated power into the wider grid once the energy store reaches its maximum practical state of charge, and to take energy from the grid once the energy store has reached its minimum practical state of charge. The exact system described uses a resistive load to simulate feed-in to the external grid, since actual feed-in was not possible for technical reasons linked to the available laboratory infrastructure.

As a result, when the state of charge of the energy store is between its maximum and minimum practical limits, the loads take power from local production, the energy store supplying any power deficit and absorbing any production surplus above and beyond that used directly by the local loads. The system hence only draws power from, or supplies excess power to, the wider grid if the energy store has a state of charge outside these limits.

This control is achieved by means of a pair of proportional-integrator controllers which serve to control the interface to take the required deficit of power from the grid when the state of charge is below the minimum threshold, and to feed surplus power into the grid when the state of charge is above the maximum threshold.

One major advantage of this system with respect to other such prior art systems is that no measurement of current individually consumed by the different loads is required; the system can be entirely controlled based on a single parameter linked to the state of charge of the energy store. In the case of a supercapacitor, this is proportional to the square of the voltage across the capacitor according to the equation $E=(C \cdot V^2)/2$, where E is the state of charge in terms of the quantity of energy stored (Joules), C is the capacitance of the supercapacitor (Farads), and V is said voltage (Volts). This represents a significant simplification with respect to e.g. the extremely complex system described in U.S. Pat. No. 8,442,698.

Although the system described in the above-mentioned paper is very promising in respect of ramp-rate alleviation and increases local consumption of locally-produced energy with respect to other systems, it does not in any way address other desirable aspects of power management such as peak-shaving. Furthermore, since the state of charge of the energy store varies constantly within large bounds, its lifetime may be limited due to excessive deep cycling.

An aim of the present invention is hence to overcome these drawbacks, and hence to propose a method of operating an energy system of the type described above, which exhibits a high performance to complexity ratio.

DISCLOSURE OF THE INVENTION

More specifically, the invention relates to a method of operating an energy system. This energy system can be electrical, pneumatic, thermal, hydraulic or similar, and generically comprises:
- a local common transmission bus, as opposed to a multiport arrangement with multiple individual connections between elements;
- at least one local energy source connected to said bus;
- at least one local load connected to said bus;
- an energy store connected to said bus;
- a controllable interface arranged to exchange energy between said bus and an external distribution network external to said energy system; and
- a controller adapted to control said interface so as to carry out said exchange of energy.

The controller is adapted to define, based on a state of charge of said energy store:
- a first state of charge corresponding to a predefined safety margin above an absolute minimum state of charge;
- a second state of charge superior to said first state of charge and corresponding to a predefined threshold above which energy substantially cannot be extracted from said external distribution network (aside from any unavoidable transients due to the dynamics of the controller);
- a third state of charge superior to said second state of charge and corresponding to a further predefined threshold below which energy substantially cannot be transferred to said external distribution network (again, aside from any unavoidable transients imposed by the dynamics of the controller);
- a fourth state of charge corresponding to a further predefined safety margin below an absolute maximum state of charge;

and wherein said controller is adapted to define:
- a first mode of said system when said state of charge is between said second and third states of charge, in which energy is transferred to or from said energy store and no energy is exchanged with said external distribution network;

a second mode of said system when said state of charge is between said first and second states of charge or between said third and fourth states of charge, in which energy is transferred to or from said energy storage system (as appropriate) for the purpose of peak-shaving and/or ramp-rate limitation, and in which energy is exchanged with the external distribution network so as to attempt to bring the system towards said first mode; and a third mode of said system when said state of charge is below said first state of charge or above said fourth state of charge, in which energy is transferred to or from said energy storage system (as appropriate) for the purpose of ramp-rate limitation and in which energy is exchanged with the external distribution network to bring said system back into said second mode.

This method of operating the system according to three distinct modes significantly reduces peak power drawn from the external network, increases self-utilisation of energy, and reduces deep cycling of the energy storage system since the system is brought towards the first mode in which the bus does not communicate with the external network. Furthermore, since the control can be carried out solely on the basis of a single factor (namely the state of charge), the number of sensors and measurements required is limited, and communication with external data sources is not required.

Advantageously, peak-shaving is carried out exclusively in said second mode.

Advantageously, peak shaving can be disabled in said second mode, for instance in a case in which it is not appropriate, or to force the system to re-enter the first mode.

Advantageously, in said second mode a limitation is imposed on the rate of energy transfer to and/or from said external distribution network. This limitation is typically removed in said third mode, in order to stop peak shaving and prevent the state of charge moving deeper below the first state of charge or above the fourth state of charge, which could result in damage to the energy store.

Advantageously, after removal of said limitation in said third mode, said limitation is reinstated only once the system is back in said second mode and the rate of energy transfer with respect to the external network has dropped below the value of said limitation. Oscillation of the state of charge around the first or fourth states of charge is thus prevented.

Advantageously, the controller comprises a first proportional-integral (PI) controller adapted to command said controllable interface so as to attempt to bring said state of charge back up to said second state of charge when it has dropped therebelow, and a second proportional-integral controller adapted to command said controllable interface so as to attempt to bring said state of charge down to said third state of charge when it has risen thereabove. The two PI controllers may be combined into one single physical or software-based controller. Since a PI controller has a finite time response, this automatically takes care of ramp-rate limitation in the second and third modes, without further computation. Furthermore, said first and second proportional-integral controllers are arranged to prohibit energy transfer via said interface when in said first mode such that the system is autonomous from the external network in this mode.

Advantageously, said controller is adapted to define an auxiliary state of charge threshold situated between said second and third states of charge above which at least one controllable load takes energy from said bus, and below which said controllable load does not take energy from said bus.

Advantageously, said second state of charge and/or said third state of charge is/are variable. This permits adapting the behavior of the system in real-time, or in anticipation of future events such as changes in consumption or production, changes in prices for energy exchange with the external network, and so on. In order to simplify control, a constant predetermined difference between said second state of charge and said third state of charge can be maintained. As a result, the thresholds are adapted synchronously.

Finally, the invention relates to an energy system comprising:

a local common transmission bus;
at least one local energy source connected to said bus;
at least one local load connected to said bus;
an energy store connected to said bus;
a controllable interface arranged to exchange energy between said bus and an external distribution network external to said energy system;
a controller adapted to control said interface so as to carry out said exchange of energy, In which said controller is adapted to command the system so as to carry out the method of any preceding claim.

BRIEF DESCRIPTION OF THE DRAWINGS

Further details of the invention will appear more clearly upon reading the description below, in connection with the following figures which illustrate.

EMBODIMENTS OF THE INVENTION

Figure 1:
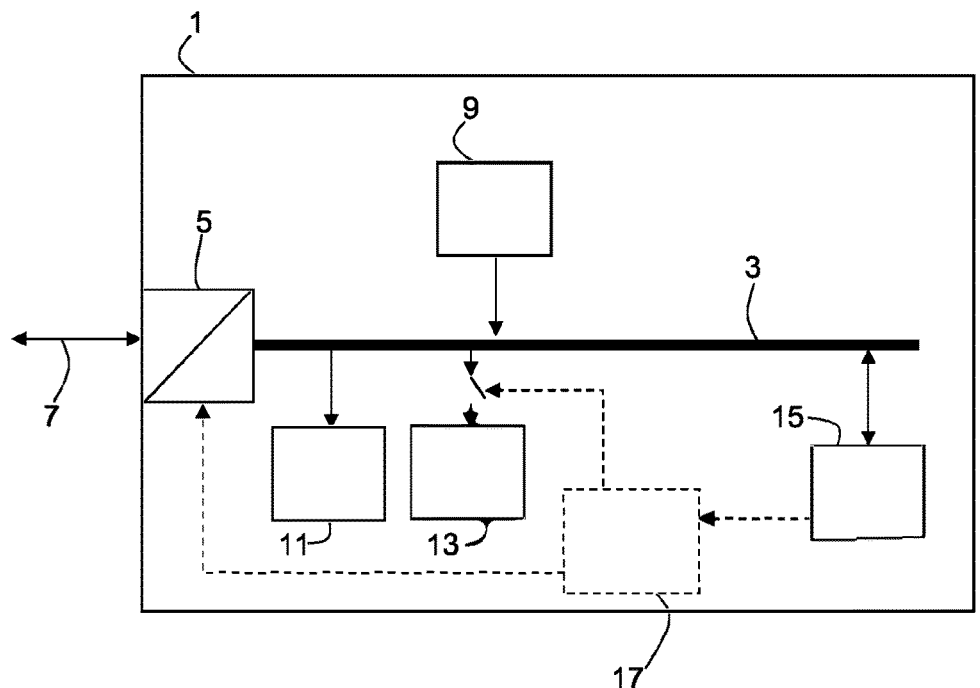
FIG. 1: a schematic block diagram of an energy system upon which the method of the invention is carried out.

FIG. 1 illustrates generically an energy system 1 upon which the method of the invention is carried out. The system 1 may comprise a microgrid, building-scale, district scale or similarly-sized grid, as distinct from a wide network grid.

This energy system 1 may be electrical, pneumatic, thermal, hydraulic or similar, the energy in question being electrical, gas pressure, heat, or hydraulic head (i.e. pressure) respectively. In the following description, reference will be more frequently made to an electrical system, since it is the most common.

The system 1 comprises a single local common transmission bus 3 which is connected to an interface 5, which is adapted to exchange energy with an external grid 7. This external grid can for instance be an electricity grid, a compressed air network in a factory complex, a district heating network, a hydraulic system or similar, as appropriate depending on the type of energy system. The bus 3 is an energy conduit (cable, pipeline, . . . ) suitable for transmitting the energy in question.

Local energy production, such as a PV system, wind turbine, compressed air compressor, gas generator, furnace, heat exchanger, hydraulic pump or similar as appropriate, is provided by a local energy source 9, which is also connected to the common bus 3, and is arranged to supply energy thereto. Should an appropriate interface be required between the local energy source 9 and the bus 3, this can be provided.

The system 1 also comprises at least one load 11, which is a local energy consumer which draws energy from the bus 3. Optionally, at least one controllable load 13 may also be provided. A controllable load 13 is a local energy consumer which can be switched on or off, according to its inherent potential limitations, rather than requiring energy to be supplied constantly or at certain times. Again, should interfaces be required, they can be placed between the loads 11, 13 and the bus 3 in order to supply energy at the correct voltage, temperature, pressure etc. as appropriate.

An energy store 15 is also bidirectionally coupled to the bus 3. In the case of electrical energy, the energy store 15 can be supercapacitors, a battery system, flywheel, pumped storage system or similar. In the case of pneumatic energy, the storage can be a gas reservoir of sufficient volume, and in the case of hydraulic energy, an open or closed header tank, water tower or similar can be used. In a thermal system, this may be a heat or cold store comprising a heated or cooled substrate. Such energy stores 15 can be arranged as single elements where appropriate, and/or may be a storage system comprising multiple elements.

Controller 17 is adapted to control interface 5 to permit bidirectional energy flow between the bus 3 and the external network 7 on the basis of a parameter relating to the state of charge of the energy store 15. The controller 17 can also command the activation of deactivation of any controllable loads 13 present, as will be described in more detail below.

Indeed, one of the advantages of this type of system 1 is that a single parameter relating to the state of charge of the energy store 15 can control the entire system simply by acting upon the interface 5. No communication system or further sensor arrangements are required, which represents a significant simplification with respect to much of the prior art. In essence, the various elements of the system other than the interface 5 and the controllable loads react autonomously to the state of the bus. In the case of interfaces being required between some of the elements and the bus as mentioned above, these can react autonomously, e.g. on the basis of bus voltage, pressure or temperature as appropriate according to the nature of the energy system.

The parameter in question should be a monotonic function of the state of charge, that is to say that it should have a correlation between the value of the parameter and the state of charge, such that each state of charge is represented by a single, unique value of the parameter. "Charge" is meant here in its most general form, and is not restricted to electrical charge. Indeed, depending on the type of system, it can be a thermal charge (as in a quantity of thermal energy), a pneumatic charge of compressed gas, a hydraulic charge of a weight and/or pressure of water, and so on.

In the case of supercapacitors, the state of charge is proportional to the square of the voltage across the supercapacitor. In the case of a battery, the parameter may be more complicated, and an interface may be required which calculates the state of charge. This can e.g. be based upon integrating energy flows into and out of the battery over time, from which the parameter can be generated. In the case of hydraulic or pneumatic systems, the state of charge is represented by the pressure in the energy store 15 and/or in the bus 3, which may be used to generate the parameter, and in the case of a thermal system, a function of temperature would be appropriate since it is a function of the thermal charge which the energy store 15 holds. Another possibility in the case of a hydraulic system would be the height of the water surface in a header tank or similar.

Figure 2:
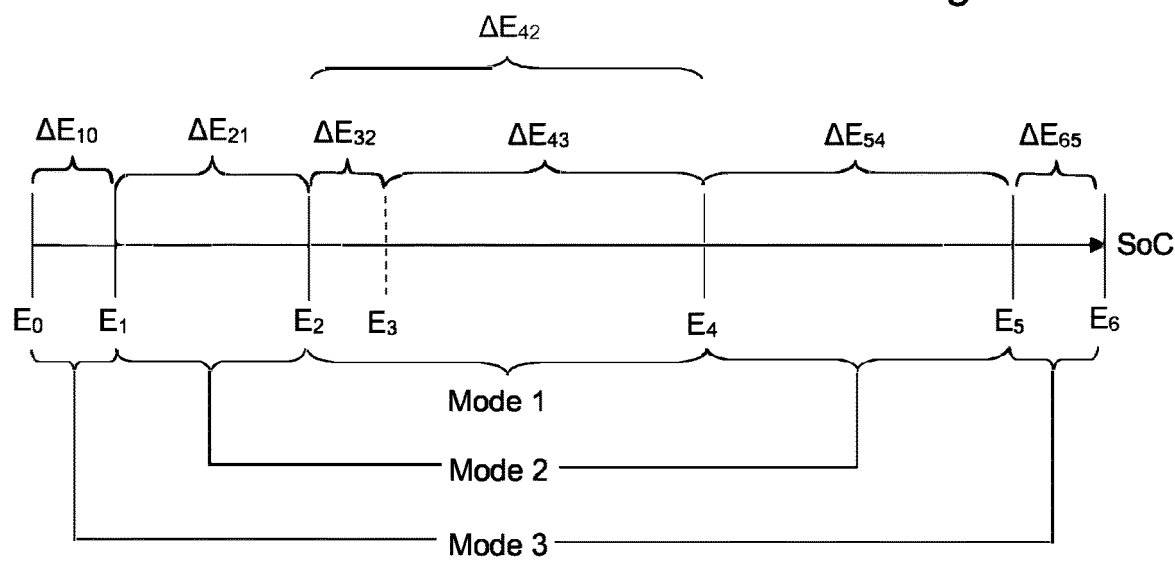
FIG. 2: a schematic representation of the states of charge defining the various modes of the system.

FIG. 2 illustrates generically the control paradigm used in the method of the invention. The horizontal axis represents the state of charge SoC of the energy store 15, increasing from left to right. The various levels of state of charge E0 to E6 represent the following levels:

E0: an absolute minimum state of charge. This would typically be defined by the physical limitations of the energy store 15. In the case of an electrical system, this may be a substantially zero voltage across a supercapacitor, a battery voltage below which no power can be drawn or below which damage to the battery occurs, or similar. In the case of a pneumatic system, this may be the energy store 15 being at atmospheric pressure. In a hydraulic system, the header tank may be empty, and in a thermal system, the energy store 15 may be at ambient temperature.

$E_1$: a predefined safety margin below which it is undesirable for the state of charge to fall for more than a certain, relatively short period of time, as will be discussed in more detail below. This corresponds to a "first state of charge" within the meaning of the invention.

$E_2$: a state of charge superior to $E_1$, above which substantially no energy can be extracted from the external distribution network 7 and below which any controllable loads 13 are switched off. This corresponds to a "second state of charge" within the meaning of the invention.

$E_3$: in the case in which controllable loads 13 are present, $E_3$, which is superior to $E_2$, defines the threshold of SoC above which these loads are switched on and can draw energy from the bus 3. If such controllable loads 13 are not present, $E_3$ is not used. $E_3$ represents an optional auxiliary state of charge.

$E_4$: a further state of charge, superior to $E_2$ and $E_3$ (if this latter is used), corresponding to a predefined threshold below which substantially no energy can be transferred to the external distribution network 7. This corresponds to a "third state of charge" within the meaning of the invention.

$E_5$: a predefined safety margin above which it is undesirable for the state of charge to rise for more than a certain, relatively short period of time, as will be discussed in more detail below. This corresponds to a "fourth state of charge" within the meaning of the invention.

$E_6$: the absolute maximum state of charge permitted, above which the energy store 15 cannot absorb more energy without being full and/or without being damaged.

It is noted that between $E_2$ and $E_4$, depending on the controller 17 response, when crossing these thresholds relatively small amounts of energy may still be transferred with the external network 7 in a transient manner, which is why the term "substantially" has been used in this context to signify that no significant, maintained, non-transient exchange with the external network 7 can occur between these SoC levels aside from that imposed by the dynamics of the controller (if applicable). This can be unavoidable for instance due to the use of a controller which has a finite time response (as in the case of PI controllers described in detail below), which hence imposes a lag on the response of the interface 5. This lag can prevent the interface 5 from switching on or off exactly at the transition between states of charge. The magnitude and duration of these transient phenomena are determined by many parameters such as the local production and consumption and the controller internal state, and are entirely dependent on the dynamics of the controller 17 chosen. However, at steady state, this transient transfer tends to zero rapidly in function of the time constant of the controller, and in the overall functioning of the system these transients are relatively small. If the controller dynamics are chosen so as to exclude such transients, they do not occur.

In the paper mentioned above, essentially only the thresholds $E_1$ and $E_5$ are used, leading to a situation in which the SoC varies between the desired minimum and maximum states of charge taking into account the factors of safety. Between these limits, the system is in a first mode which is dominated by in which self-consumption by the loads 11, 13. Any deficit between the energy requirements and energy production is extracted from the energy store 15, and any surplus of production is stored therein. If the SoC is reduced to $E_1$, energy is taken from the external grid instead of from the energy store 15 and the SoC remains constant until local production is again in surplus. If the SoC reaches $E_5$, surplus energy production is fed into the external grid, and again the SoC remains constant until local production is again in deficit. This is clearly explained in the document in connection with FIG. 2 of the paper, and results in extremely deep cycling of the energy store. With certain types of batteries, for instance, this deep cycling negatively affects the lifetime of the batteries, and is thus to be avoided.

In contrast, in the present invention, this first mode exists between the states of charge $E_2$ and $E_4$. In this state, the interface 5 is commanded by the controller 17 to not exchange energy with the external network 7, and local production is used for local consumption with any surplus or deficit being fed to, or supplied by, the energy store 15. In essence, the system 1 is autonomous with respect to the external network 7 while the SoC remains between $E_2$ and $E_4$. No ramp rate limitation (see below) occurs since no exchange of energy with the external network 7 takes place.

Between $E_1$ and $E_2$, and between $E_4$ and $E_5$, the controller 17 is in a second mode, which is distinct from the first mode. In this mode, the controller 17 permits power to be exchanged with the external network 7 for the purpose of so-called peak shaving and also ramp rate limitation (RRL).

Peak shaving is the principle of reducing demand on the external network 7 during peak pricing hours, during which energy is more expensive, and/or, in the case in which the consumer is also charged a fee based on the peak power load (i.e. the peak rate at which energy is taken from the external network 7), reducing this peak load by taking more energy from the energy store 15 during peak times. In other words, the rate at which energy is taken from the external network 7 can be capped, e.g. below a threshold at which a higher charge is applied by the supplier.

Hence, when the SoC is between $E_1$ and $E_2$, for instance due to a significant deficit of local production that has caused the SoC to fall to below $E_2$, the system is in the lower part of the second mode. Controller 17 commands the interface 5 to draw energy from the external network 7, so as to attempt to bring the SoC back up to $E_2$, and thereby to put the system back into its first mode. If the controller 17 imposes a maximum power draw on the interface 5, peak shaving on the basis of this maximum power draw occurs since the deficit between local demand by the loads 11 and the sum of supply from local production supplied by the local source 9 and the maximum power draw from the external network 7 is automatically and passively made up by draw from the energy store 15, which will cause the SoC to drop further below $E_2$. In simulations with an electrical prototype of the present system 1, such peak shaving reduced the maximum power draw from around 32 kW to around 7 kW.

Conversely, if a significant surplus of local production has caused the SoC to rise above $E_4$ into the upper part of the second mode, the controller 17 commands the interface 5 to feed energy into the external network 7 so as to attempt to bring the SoC back down to $E_4$, and thereby again to put the system back into its first mode. The above comments regarding limitation of power draw apply equally to feed in, which can likewise be limited.

The controller 17 may incorporate a hysteresis in its control strategy to avoid oscillating between the first and second modes around states of charge $E_2$ and $E_4$.

Ramp rate limitation is the principle of reducing the rate at which the power exchange with the external network takes place, to avoid sudden demands thereupon. This takes place in the second mode due to the response of the controller 17, and is explained in detail below.

Between $E_0$ and $E_1$, and between $E_5$ and $E_6$, the system is in a third mode, distinct from said first and second modes. In this mode, the energy store 15 is considered to have a SoC at its practical limits, while leaving a margin of safety between absolutely empty and absolutely full. As a result, below $E_1$ (i.e. in the lower part of the third mode), the energy store can no longer be drawn upon for local consumption, and consequently any power limitation imposed on the interface 5 is removed and as much energy as required to bring the SoC back towards $E_2$ can be drawn. Hence, no more peak shaving can occur since the SoC is too low to support it.

Likewise, if the SoC has risen above $E_5$ and the system is hence in the upper part of the third mode, for instance due to an excessive surplus of local production that cannot be exchanged with the external network 7 due to limitations imposed on the interface 5, the excess of local production can no longer be stored in the energy store 15, and must be fed into the external network 7 to avoid a dangerous situation which may damage the energy store 15 by overcharging it. This results in unlimited quantities of energy being fed into the external network 7 without artificially-imposed limit so as to bring the SoC back down to below $E_5$. In essence, the only limits for power exchange with the external network 7 in the third mode are imposed by the physical limitations of the interface 5, bus 3 and external network 7.

As a result, it is clear that the SoC cannot fall below $E_1$ or rise above $E_5$ except in a transient manner imposed by the time response of the controller 17 and the reactiveness of the interface 5, since essentially unlimited power exchange with the external network 7 can occur.

Indeed, transient excursions into the third mode can only occur for the purpose of ramp rate limitation, which takes place in both the second and third modes and is explained in detail in the following paragraphs.

Local energy production by the local energy source can be highly variable, with first derivatives of the power produced (i.e. second derivatives of the energy produced) representing significant rates of change. In the context of a PV system, the shadow of a cloud passing over the system on an otherwise sunny day will cause a sudden drop in the power production, and likewise once the cloud passes, the power produced will increase again suddenly. If in any particular district there are multiple system users, their local production will ramp up and ramp down at approximately the same time. This imposes significant constraints on the external network as multiple consumers all suddenly draw or feed in energy at a similar moment, which can lead to service quality issues on the external side such as voltage spikes, voltage drops and so on as the main supplier to the network 7 (e.g. a conventional power station in the case of an electrical system) cannot follow the demand curve due to slower response times of their larger, centralised energy sources. In the case of a thermal system, this results in temperature spikes and drops, and in pneumatic or hydraulic systems leads to pressure spikes and drops as the centralised energy supply cannot match the ramp rates in the demand curve.

As a result, the system 1 is adapted to carry out ramp rate limitation in respect of its demands upon the external network 7. In qualitative terms, this involves transiently drawing or supplying (as appropriate) energy to the energy store 15 so as to prevent significant ramp rates in supply or demand to or from the external network 7. In other words, for instance in the case of a step change in local supply or demand while in the second mode, the controller ensures that the response of the interface 5 is smoothed by transiently exchanging energy with the energy store 15 such that the external network 7 does not need to suddenly supply or absorb this step change.

The simplest manner in which this can be achieved is to use a controller 17 with an appropriate transient response, which hence serves to throttle the rate of change of power passing through the interface 5. We will return to this point below.

Figure 3:
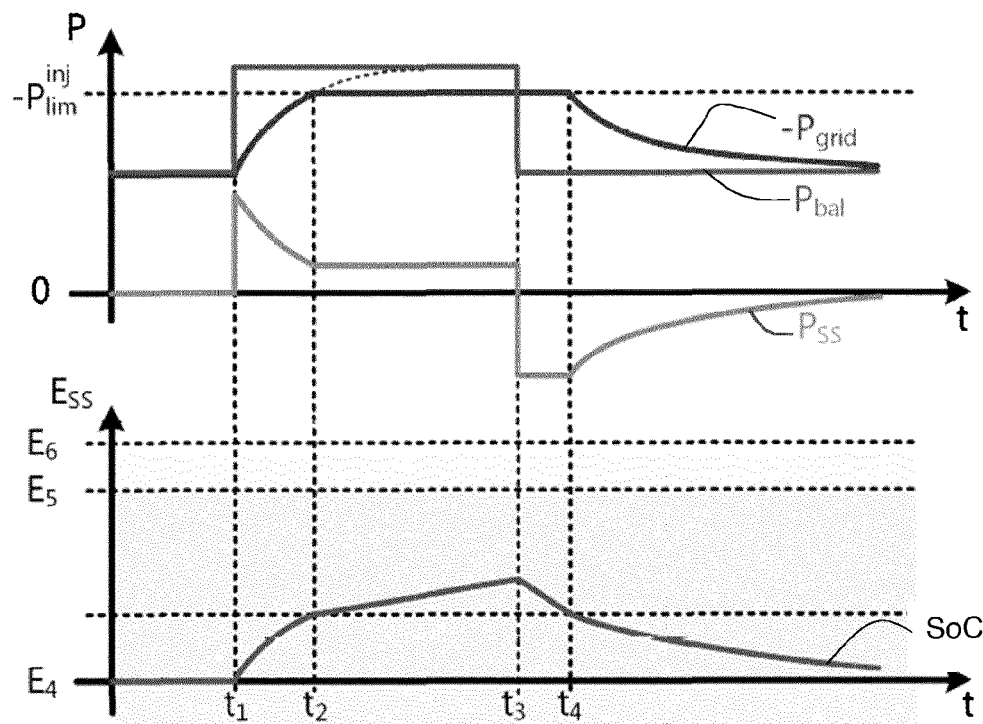
FIGS. 3-5: graphs of the behavior of the system when subject to the method of the invention.

FIG. 3 illustrates the principles of ramp rate limitation (RRL) and peak shaving (PS) applied by the method of the present invention in the second mode. In order to simplify understanding, these graphs have been drawn presuming electrical power, however "power" can also be understood in the context of rate of change of thermal, pneumatic or hydraulic energy in the case of non-electrical embodiments of the system 1.

The upper graph represents the various power flows, in which $P_{bal}$ is the local power balance between local production by the energy source 9 and consumption by the loads 11, 13. $-P_{grid}$ is the power flowing out through the interface 5 into the external network 7 (negative being defined as outflow through the interface 5), which is limited in the second mode to a value of $-P_{lim}$. This limitation value can be set as desired so as to optimise the performance of the system 1. The lower graph represents the SoC (also referred to as $E_{ss}$) of the energy store 15. The graphs are aligned with respect to the horizontal time axis.

At the origin of the time axis, the SoC is maintained in the second mode at $E_4$, with the net power balance inside the system 1 being equal to the feed-in of power into the external network 7.

At time $t_1$, a positive step change in the power balance occurs. This could occur, for instance, due to a sudden increase in local production and/or a sudden drop in local demand, such as a load 11, 13 being manually or automatically turned off for reasons outside the control of the controller 17.

As a result, the SoC rises above $E_4$, and the controller 17 commands the interface 5 to feed more power into the external network 7. However, the response rate of the controller 17 is such that it does not permit the interface to follow the power balance exactly, and as a result the power fed into the external network 7 rises at a lower rate than the change in the power balance. The difference between the power balance $P_{bal}$ and grid power $-P_{grid}$ curves is made up by power, and hence energy, flowing into the storage system 15. Power flow rates into and out of the energy storage 15 are not limited, and hence the curve $P_{ss}$ spikes, before reducing as the rate of transfer into the external network 7 catches up. Hence, the ramp rate of the demand with respect to the external network 7 is limited.

Since we are in the second mode, the magnitude of power exchanges with the external network 7 are limited, and as a result, $-P_{grid}$ cannot rise beyond the value of $-P_{lim}$. It reaches this limit at $t_2$. Without this limitation, the curve of $-P_{grid}$ would rise to meet the $P_{bal}$ curve, as indicated by the dotted curve.

Figure 4:
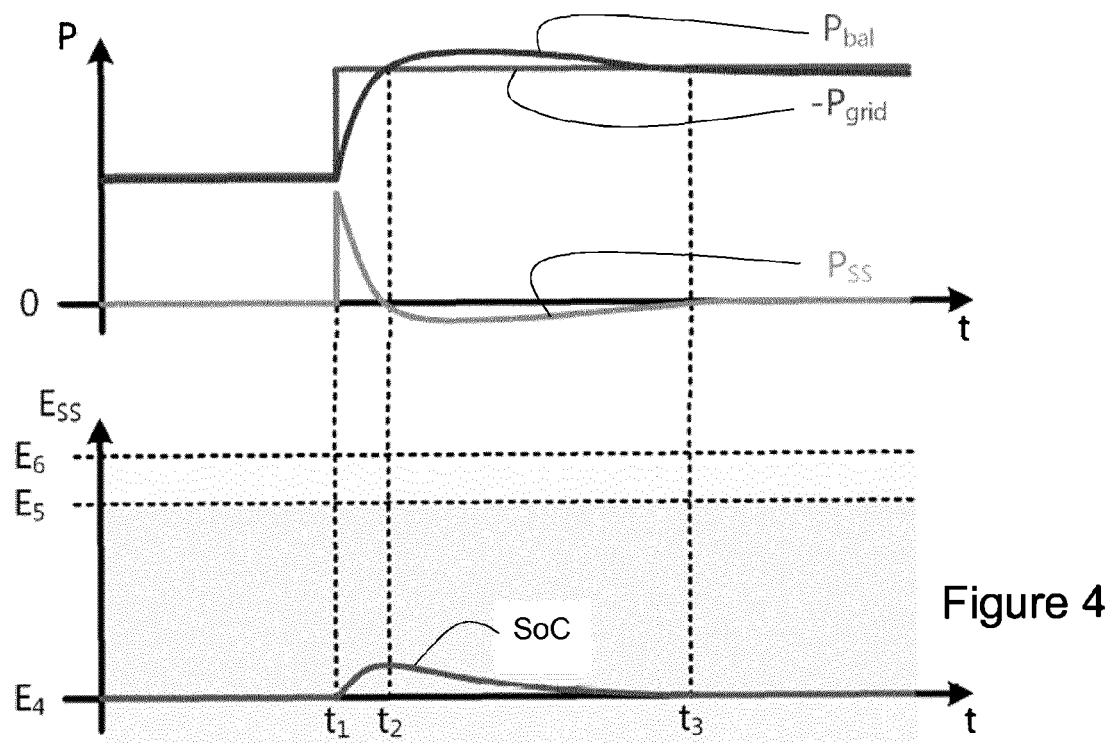

The situation in which $-P_{grid}$ does not reach $-P_{lim}$ is illustrated in FIG. 4, which shows that $-P_{grid}$ initially rises as in FIG. 3, but then overshoots $P_{bal}$ at $t_2$, and subsequently re-descends to follow $P_{bal}$. The difference in power represented by difference between the $P_{bal}$ and $-P_{grid}$ curves is exchanged with the energy store 15, which causes a brief increase in SoC from $t_1$ to $t_2$, this then being "repayed" by interaction with the external network 7 between $t_2$ and $t_3$, from which point the SoC has returned to $E_4$.

To return now to FIG. 3, since the power being supplied to the external network 7 is limited and is hence being peak shaved beyond $t_2$, there is an excess of power, represented by the difference between $P_{bal}$ and $-P_{grid}$, which flows into the energy store 15. This is indicated by the curve $P_{ss}$ and also by the increase in SoC starting from $t_2$.

At $t_3$, the value of $P_{bal}$ returns to its former level, e.g. following an increase in local demand or a reduction in local production. Due to the response of the controller 17, again the demand on the external network 7 does not immediately fall to follow. The immediate change at $t_3$ is absorbed by drawing energy from the energy store 15, as can be seen by the negative value of $P_{ss}$, and the fact that the SoC curve drops. However, in the illustrated embodiment $-P_{grid}$ does not start to drop until $t_4$, when the feed-in power that would have been exchanged in the absence of the limitation $-P_{lim}$ crosses the $-P_{lim}$ threshold. However, it is also possible to arrange the controller 17 differently so that $-P_{grid}$ starts to fall immediately at $t_3$.

From $t_4$ onwards, the power fed into the external network 7 drops according to the response rate of the controller 17, and continues dropping until it reaches the value of $P_{bal}$. The SoC drops until it reaches $E_4$ again.

From the foregoing, it can clearly be seen how ramp rate limitation and peak shaving are carried out in the second mode, in the context of a SoC between $E_4$ and $E_5$. For a SoC between $E_1$ and $E_2$, the same considerations apply mutatis mutandis, the signs and directions of power flows being inverted and the limit being at a value of $+P_{lim}$ (which may be symmetrical with respect to $-P_{lim}$ or may have a different magnitude), and it is not needed to describe them in greater detail here.

Figure 5:
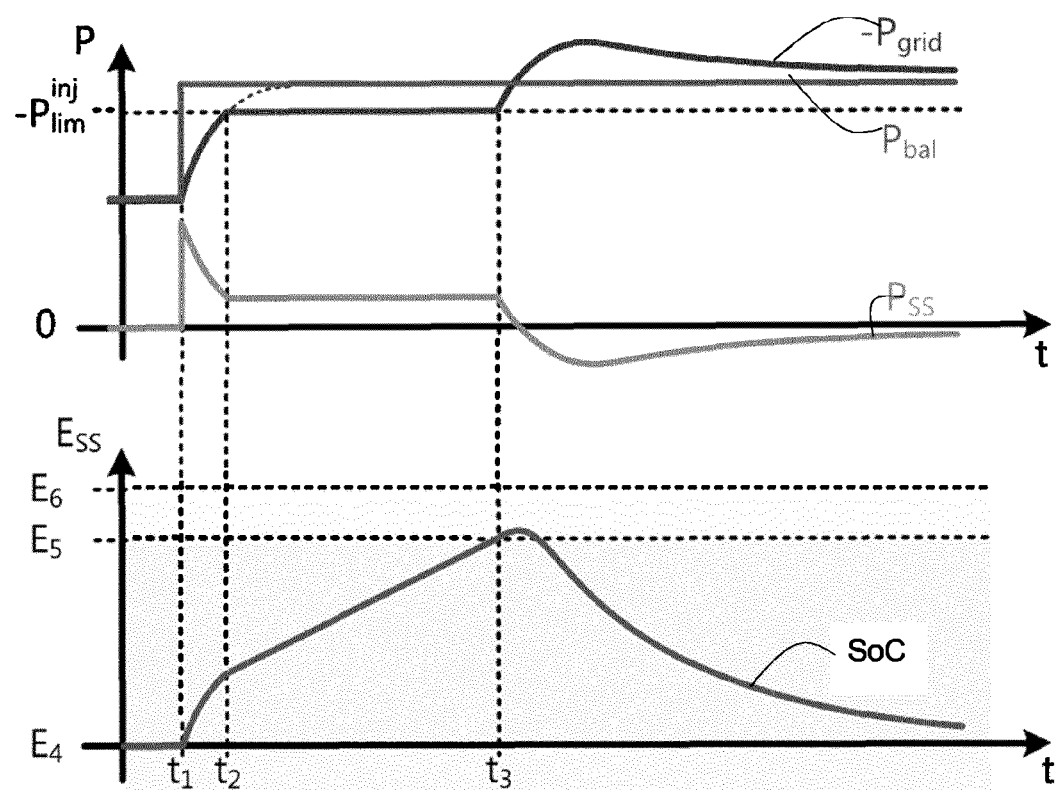

FIG. 5 illustrates a similar situation, which is identical to FIG. 3 between the origin and shortly after $t_2$. However, in this case, instead of the power balance $P_{bal}$ reducing at a certain point, it is maintained unchanged.

As a result, the SoC continues to increase and reaches $E_5$ at $t_3$, which puts the system into its third mode. At this point, the energy store 15 is obliged not to take significantly more charge, otherwise it may be destroyed.

One possible solution is simply to remove the limitation enabling unlimited exchanges of power with the external network 7 until the SoC re-descends below $E_5$, at which point the limitation can be reinstated and peak shaving can recommence. Due to the limited time response of the controller 17, this will result in an initial rise of SoC above $E_5$, followed by an oscillation around E5, this limited time response again ensuring ramp rate limitation with respect to changes in the rate of power transfer with the external network 7. Indeed, the only incursions into the SoC space above E5 which are permitted are for the purpose of ramp rate limitation as shown in FIG. 4, and are engendered by the response rate permitted by the controller 17, and is hence entirely contingent on the dynamics of this latter and cannot be quantified for the general case. Advantageously, the interval between $E_0$ and $E_1$ (i.e. $E_{10}$) and between $E_5$ and $E_6$ (i.e. $E_{65}$) can be sized in such a way that, in the case of an infinitely fast perturbation with a magnitude of half the rated power of the interface 5, the SoC will exactly reach $E_0$ or $E_6$, depending on the case. However, these intervals can be sized differently according to the needs of the designer.

the SoC has dropped below $E_5$ and $-P_{grid}$ has dropped below the limit $-P_{lim}$.

Also, in the case in which controllable loads 13 are present, the controller 17 can switch them on and off depending upon whether the SoC is respectively above or below the values $E_3$ and $E_2$.

This is summarised in the following table:

| SoC | Mode | Description |
| --- | --- | --- |
| $>E_5$ | Third (upper) | Controllable loads on if present; no exchange with energy store 15 except transiently for RRL; feed-in to external network 7 without limitation |
| $<E_5$, $>E_4$ | Second (upper) | Controllable loads on if present; exchange with energy store 15 for RRL and peak shaving; feed-in to external network 7 with limitation unless recovering from $>E_5$ and limit still exceeded |
| $<E_4$, $>E_3$ | First | Controllable loads on if present; no exchange with external network 7; exchange with energy store 15 for RRL and local consumption |
| $<E_3$, $>E_2$ | First | Controllable loads off if present; no exchange with external network 7; exchange with energy store 15 for RRL and local consumption |
| $<E_2$, $>E_1$ | Second (lower) | Controllable loads off if present; exchange with energy store 15 for RRL and peak shaving; extraction from external network 7 with limitation unless recovering from $<E_1$ and limit still exceeded |
| $<E_1$ | Third (lower) | Controllable loads off if present; no exchange with energy store 15 except transiently for RRL; import from external network 7 without limitation |

The same considerations apply around SoC $E_1$, mutatis mutandis, with the signs and directions of flows again reversed.

If such an oscillation of SoC around $E_5$ and/or $E_1$ is undesirable, once the limitation of $-P_{lim}$ has been cancelled so as to enable essentially unlimited power transfer with the external network 7 within the physical constraints of the system, it can remain cancelled until such time as $-P_{grid}$ has recovered back below its limit, at which point the limit is reinstated. Such a situation is illustrated in FIG. 4. At $t_3$, the limitation on $-P_{grid}$ is removed, causing $-P_{grid}$ to rise and essentially unlimited power to be fed into the external network 7. The SoC rises briefly for the purposes of ramp rate limitation as mentioned above, the SoC not exceeding $E_5$ more than the amount indicated previously. From $t_3$ onwards, the power balance $P_{bal}$ remains the same, keeping the system in a case of excess power production. However, by maintaining the limit $-P_{lim}$ inactive even once the SoC has descended below $E_5$ again, the system will keep feeding in power to the external network 7 limited only by the physical system limitations until the SoC descends below $E_4$, and the system is put briefly back into its first mode before rising again.

However, in practice such a power balance profile is unlikely and is used here for illustrative purposes, and the SoC is unlikely ever to descend to $E_4$ without $-P_{grid}$ descending below the limitation value of $-P_{lim}$. Once the limitation has been crossed, the controller 17 re-imposes the limitation, and a situation analogous to that between $t_1$ and $t_3$ of FIG. 4 re-imposes itself.

From the foregoing it can clearly be seen that the controller acts as a finite state machine, commanding the interface 5 based on the threshold levels $E_1$, $E_2$, $E_4$ and $E_5$ of the SoC. Furthermore, as an optional extra parameter, the limitations with respect to rates of energy exchange with the external network 7 can be maintained deactivated until both As mentioned above, the controller 17 has response incorporating a time constant. A simple way to achieve this is to use one or more proportional-integrator controllers, which by their very nature have a time-lag in their response.

Figure 6:
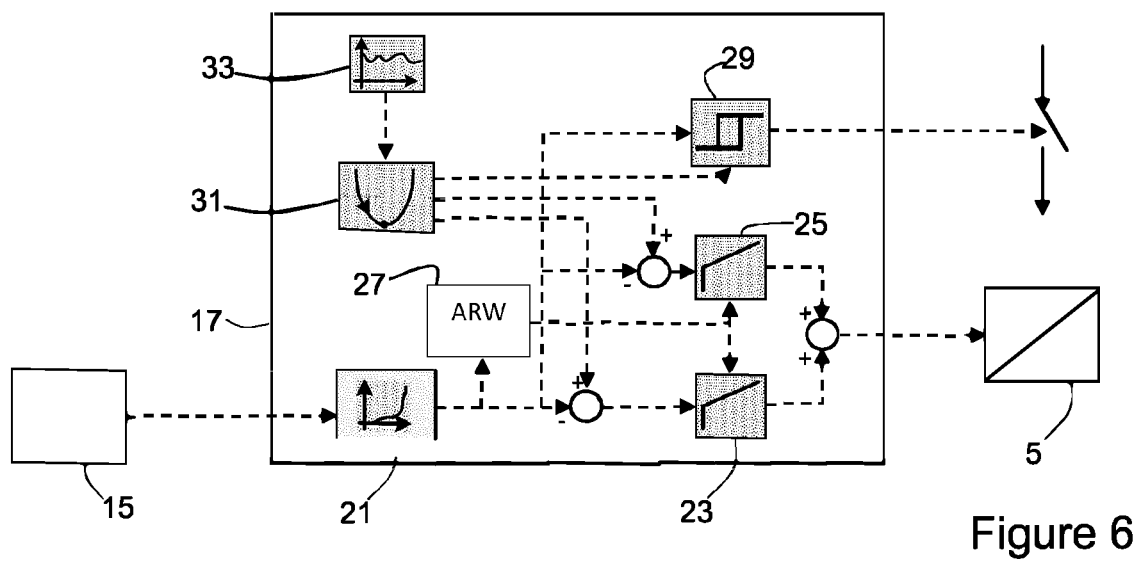
FIG. 6: a schematic block diagram of a controller architecture.

FIG. 6 illustrates a variant of such a control architecture for the controller 17 of the system 1 of FIG. 1, pictured alongside the other elements of the system 1 with which it interacts.

As mentioned above, the control unit 17 receives information regarding the SoC of energy store 15, such as a voltage, temperature, pressure or similar, as appropriate according to the type of energy being stored and the nature of the energy store 15. This is then converted into usable information by means of a state of charge estimator 21.

The output of the SoC estimator 21 is then fed to a pair of proportional-integral (PI) controllers 23, 25. First PI controller handles the change from the first mode to the second mode at $E_2$, and its output is exclusively positive in order to command the interface 5 to draw power from the external network 7 below $E_2$. Second PI controller 25 handles the transition at $E_4$. Its output is exclusively negative and it commands the interface 5 to inject power to the external network 7 above $E_4$. If the SoC is between $E_2$ and $E_4$, the outputs of both PI controllers 23, 25 will be deactivated, which will result in the interface 5 not exchanging power with the external network 7.

Since PI controllers have a response time subject to a predefined time constant, this arrangement automatically takes care of ramp-rate limitation as described above, without any specific computation being required. As mentioned above, these time constants may also result in a relatively small amount of unavoidable power transfer through the interface 5 upon entering into the first mode due to the deactivation of the PI controllers being subject to a slight transient timelag.

Furthermore, since the two controllers are never simultaneously active, they can be combined into a single controller with a more complex implementation.

As discussed above, these PI controllers 23, 25 are arranged to limit the rate of energy exchange with the external grid 7, with threshold values $+P_{lim}$ and $-P_{lim}$ in the second mode. However, this limitation is cancelled in the third mode, by means of limitation controller 27, which modifies behaviour of the PI controllers 23, 25 in the third mode so as to suppress the limits, and maintains this suppression until the magnitude of the power exchange drops below the limits while in the second mode.

Furthermore, the PI controllers 23, 25 can advantageously incorporate anti-reset windup, which is controlled by the limitation controller 27 when the PI controllers saturate at an output level of zero or $+/-P_{lim}$. This causes the integrator output value to be frozen, which avoids an error building up. Such an error buildup can cause the integrator value to jump suddenly once the limitation is removed when the system transitions into the first mode, which would result in a significant ramp rate. In the opposite case, it can also cause a delay before the integrator output behaves correctly since this error (e.g. a negative value for an integrator that should be giving positive outputs or vice versa) has to be "wound down" back to the correct range.

As a result, the limitation controller artificially sets the integrator value at the transition between the second and third modes to compensate this behaviour, and to ensure that ramp rate limitation can still take place at the transitions between the second and third modes. The integrator value is also blocked at the transition between the second and first modes to prevent it "undercounting" in the first mode, in which it does not act. The skilled person understands how to perform such setting of the integrator value so as to achieve this. Furthermore, it should be noted that anti-reset windup can be disabled if required when the integrator output is zero.

It should also be noted that other types of control can be utilised, and that the invention is not limited to PI controllers.

In the case in which controllable loads 13 are present, they can be switched on by means of a Schmitt trigger 29 commanded on the basis of the output of the SoC estimator 21. The hysteresis of the Schmitt trigger 29 can be chosen at will to prevent the system from oscillating around $E_3$.

Furthermore, the controller 17 may incorporate real-time optimisation of the values of $E_1$, $E_2$, $E_3$, $E_4$ and $E_5$, to best maximise the storage capacity of the energy store 15 and to reduce costs paid to the operator of the external network 7. Also, the power limitations $P_{lim}$ and $-P_{lim}$ can also be varied in real-time so as to optimise the behaviour of the system 1, these values representing the saturation values of the PI controllers 23, 25.

For instance, the controller 17 can comprise an optimiser 31, which acts upon the input to the PI controllers 23, 25 (and optionally also upon the Schmitt trigger 29) so as to modify the SoC levels at which the system changes mode.

Optimiser 31 can be fed information from an estimator 33, which takes into account information such as anticipated consumption during the following period of time (e.g. hour, day, week . . . ), anticipated production (e.g. based on weather forecast information that is relevant to the expected levels of production of the energy source 9 in the case in which this is a photocell, wind turbine or other weather-dependent source), external network supply costs when these are time-dependent (e.g. with peak and off-peak tariffs), real-time information such as prices, historical data (such as measurements of the system 1 which have been previously stored) and so on.

Figure 7:
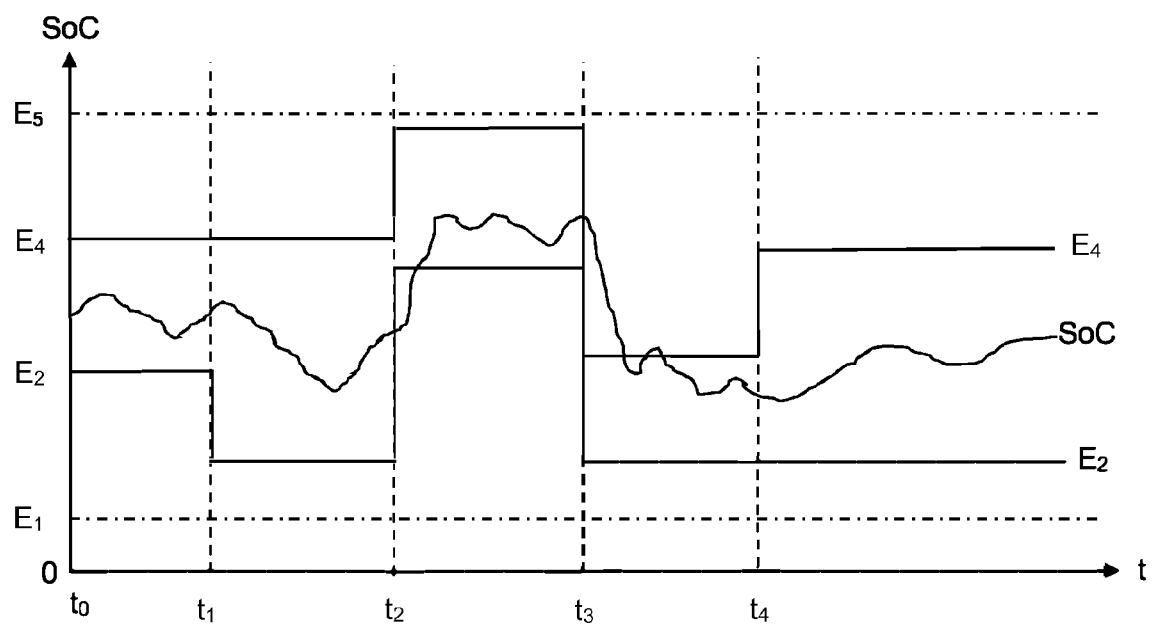
FIG. 7: a schematic graph illustrating the principle of varying the thresholds of states of charge $E_2$ and $E_4$ to optimize the use of the system.

An example of such modification of various threshold levels is illustrated in FIG. 7.

At time t0, the system is at quasi-equilibrium in the first mode, the SoC varying between $E_2$ and $E_4$.

In anticipation of cheaper energy import at a later time at $t_2$ and when the SoC and local production are predicted to be adequate to supply all the needs in the intervening period, at time $t_1$ the optimiser 31 may reduce the value of $E_2$, so as to permit use of more of the energy storage capacity for local consumption. In such a situation, own consumption has a higher net present value than importing from the external network, and time-shifting import of energy into the future is economically advantageous.

Once the energy tariff is reduced at $t_2$, the optimiser 31 may then raise the level of $E_2$, and optionally also $E_4$, so as to increase the SoC via increased import of relatively cheap energy.

At $t_4$, due to an increase in feed-in tariff, both $E_2$ and $E_4$ are again lowered, since feeding-in to the external network becomes more financially advantageous than self-consumption, and the SoC is allowed to fall. As illustrated, $E_4$ is lowered sufficiently to force the system to feed energy into the external network, since in the illustrated case $E_4$ is reduced to below the previous value of $E_2$.

At $t_4$, $E_4$ is raised and $E_2$ is left at a lower level to permit wide fluctuations in SoC without interacting with the external network 7.

If controllable loads 13 are present, $E_3$ is also adjusted along with $E_2$ as appropriate.

In order to simplify control of the thresholds, it is possible to adjust $E_2$ and $E_4$ with a fixed difference, corresponding to e.g. 60%, 50%, 40%, or any other convenient percentage of the range of the SoC between $E_0$ and $E_6$ or between $E_1$ and $E_5$, while maintaining $E_4 < E_5$ and $E_2 > E_1$.

By means of such adjustments of the values of $E_2$ and $E_4$, peak shaving can be optimised further than simply by having fixed values of $E_2$ and $E_4$, thereby taking into account anticipated consumption, production, pricing and so on.

The optimiser 31 can thus be programmed to optimise the utilisation of storage capacity on the basis of the foregoing factors.

Finally, it is noted that various optimisation strategies in respect of the capacity of the energy store 15 and the installed capacity of the local energy source 9 are known to the skilled person, who can apply them appropriately.

Although the invention has been described in terms of specific embodiments, variations thereto are possible without departing from the scope of the invention as defined in the appended claims.

The invention claimed is:

1. Method of operating an energy system, said energy system comprising:
   a local common transmission bus;
   at least one local energy source connected to said local common transmission bus;
   at least one local load connected to said local common transmission bus;
   an energy store connected to said local common transmission bus;
   a controllable interface arranged to exchange energy between said local common transmission bus and an external distribution network external to said energy system;
   a controller adapted to control said controllable interface so as to carry out said exchange of energy;
   wherein said controller is adapted to define, based on a state of charge of said energy store:

a first state of charge corresponding to a predefined safety margin above an absolute minimum state of charge;

a second state of charge superior to said first state of charge and corresponding to a predefined threshold above which substantially no energy can be extracted from said external distribution network;

a third state of charge superior to said second state of charge and corresponding to a further predefined threshold below which substantially no energy can be transferred to said external distribution network;

a fourth state of charge corresponding to a further predefined safety margin below an absolute maximum state of charge;

and wherein said controller is adapted to define:

a first mode of said energy system when said state of charge is between said second and third states of charge, in which energy is transferred to or from said energy store and no energy is exchanged with said external distribution network;

a second mode of said energy system when said state of charge is between said first and second states of charge or between said third and fourth states of charge, in which energy is transferred to or from said energy store for the purpose of at least one of peak-shaving and ramp-rate limitation, and in which energy is exchanged with the external distribution network so as to attempt to bring the energy system towards said first mode; and a third mode of said energy system when said state of charge is below said first state of charge or above said fourth state of charge, in which energy is transferred to or from said energy store for the purpose of ramp-rate limitation and in which energy is exchanged with the external distribution network to bring said energy system back into said second mode.

2. Method according to claim 1, wherein the peak-shaving is carried out exclusively in said second mode.

3. Method according to claim 1, wherein the peak-shaving can be disabled in said second mode.

4. Method according to claim 1, wherein in said second mode a limitation is imposed on a rate of energy transfer to and/or from said external distribution network.

5. Method according to claim 4, wherein said limitation is removed in said third mode.

6. Method according to claim 5, wherein, after removal of said limitation in said third mode, said limitation is reinstated only once the energy system is back in said second mode and the rate of energy transfer with respect to the external distribution network has dropped below a value of said limitation.

7. Method according to claim 1, wherein said controller comprises:

a first proportional-integral controller adapted to command said controllable interface so as to attempt to bring said state of charge back up to said second state of charge when it has dropped therebelow, and a second proportional-integral controller adapted to command said controllable interface so as to attempt to bring said state of charge down to said third state of charge when it has risen thereabove.

8. Method according to claim 7, wherein said first and second proportional-integral controllers are arranged to prohibit energy transfer via said controllable interface when in said first mode.

9. Method according to claim 1, wherein said controller is adapted to define an auxiliary state of charge threshold situated between said second and third states of charge above which at least one controllable load takes energy from said local common transmission bus, and below which said at least one controllable load does not take energy from said local common transmission bus.

10. Method according to claim 1, wherein at least one of said second state of charge and said third state of charge is variable.

11. Method according to claim 10, wherein at least one of said second and third states of charge is variable in function of at least one of:

predicted energy consumption by said at least one local load;

predicted energy production by said at least one local energy source;

predicted prices for consumption from said external distribution network;

predicted prices for feed-in to said external distribution network.

12. Method according to claim 11, wherein a constant predetermined difference between said second state of charge and said third state of charge is maintained.

13. Energy system comprising:

a local common transmission bus;

at least one local energy source connected to said local common transmission bus;

at least one local load connected to said local common transmission bus;

an energy store connected to said local common transmission bus;

a controllable interface arranged to exchange energy between said local common transmission bus and an external distribution network external to said energy system;

a controller adapted to control said controllable interface so as to carry out said exchange of energy, wherein said controller is adapted to command the energy system so as to carry out the method of claim 1.

* * * * *